United States Patent
De Castro Nodal et al.

(10) Patent No.: US 6,616,101 B2
(45) Date of Patent: Sep. 9, 2003

(54) LEADING EDGE OF SUPPORTING SURFACES OF AIRCRAFT

(75) Inventors: Manuel De Castro Nodal, Madrid (ES); Carlos Cerezo Pancorbo, Madrid (ES); Rafael Dominguez Casado, Madrid (ES); Cesar Grueso Diez, Madrid (ES); Manuel Huertas Garcia, Madrid (ES); Bonifacio Robledo Sacristan, Madrid (ES)

(73) Assignee: Construcciones Aeronauticas, S.A., Madrid (ES)

( * ) Notice: Subject to any disclaimer, the term of this patent is extended or adjusted under 35 U.S.C. 154(b) by 0 days.

(21) Appl. No.: 09/828,292

(22) Filed: Apr. 6, 2001

(65) Prior Publication Data

US 2002/0011540 A1 Jan. 31, 2002

(30) Foreign Application Priority Data

Jul. 27, 2000 (ES) .......................................... 200001888

(51) Int. Cl.[7] .............................................. B64C 3/18
(52) U.S. Cl. ....................................................... 244/123
(58) Field of Search ................................ 244/123, 133, 244/117 R

(56) References Cited

U.S. PATENT DOCUMENTS

| | | | | | |
|---|---|---|---|---|---|
| 1,749,293 | A | * | 3/1930 | Marston et al. ................. | 52/84 |
| 1,781,160 | A | * | 11/1930 | Carns ......................... | 244/123 |
| 1,887,627 | A | * | 11/1932 | Finger ........................ | 244/123 |
| 1,956,823 | A | * | 5/1934 | Carns ......................... | 244/123 |
| 1,988,085 | A | * | 1/1935 | Orlando ....................... | 244/131 |
| 2,372,510 | A | * | 3/1945 | Mitchell ....................... | 244/123 |
| 4,051,289 | A | * | 9/1977 | Adamson ...................... | 156/227 |
| 4,535,958 | A | * | 8/1985 | Hutchison .................... | 244/123 |
| 4,538,780 | A | * | 9/1985 | Roe ........................... | 244/123 |
| 4,565,595 | A | * | 1/1986 | Whitener ...................... | 156/156 |
| 4,662,587 | A | * | 5/1987 | Whitener ................. | 244/117 R |
| 4,687,162 | A | * | 8/1987 | Johnson et al. ............. | 244/213 |
| 4,962,904 | A | * | 10/1990 | Perry et al. ................... | 244/123 |
| 5,216,799 | A | * | 6/1993 | Charnock et al. ............ | 244/133 |
| 5,332,178 | A | * | 7/1994 | Williams ...................... | 244/123 |
| 5,476,704 | A | * | 12/1995 | Kohler ........................ | 244/119 |
| 5,484,221 | A | * | 1/1996 | DeCoux ....................... | 244/123 |
| 5,501,414 | A | * | 3/1996 | Bauer .......................... | 244/123 |
| 5,848,765 | A | * | 12/1998 | Gillespie ..................... | 244/120 |
| 6,050,523 | A | * | 4/2000 | Kraenzien .................... | 244/123 |
| 6,116,539 | A | * | 9/2000 | Williams et al. ............. | 244/123 |
| 6,237,873 | B1 | * | 5/2001 | Amaoka et al. ............. | 244/123 |

FOREIGN PATENT DOCUMENTS

DE          0485027 A2  * 10/1990  ............. B64C/3/26

* cited by examiner

*Primary Examiner*—Charles T. Jordan
*Assistant Examiner*—Timothy D Collins
(74) *Attorney, Agent, or Firm*—Ladas & Parry

(57) ABSTRACT

Leading edge of supporting surfaces of aircraft. A primary structure (EP) made without ribs is assembled with a specific frontal area (ZF) against impacts. The primary structure comprises two upper and lower covering panels (1, 2) and two diagonal and frontal spars (3, 4), which constitute the strong and rigid structural assembly of the leading edge (BA). The frontal area (ZF) is made up of one or two elemental parts which determine a kind of roof tile which closes the outer aerodynamic contour of the profile of the leading edge (BA) and provides a good behaviour against erosion, operational impacts on the ground and the impact of birds in flight. The invention is applicable to wings, stabilizers and control surfaces of aeroplanes.

11 Claims, 4 Drawing Sheets

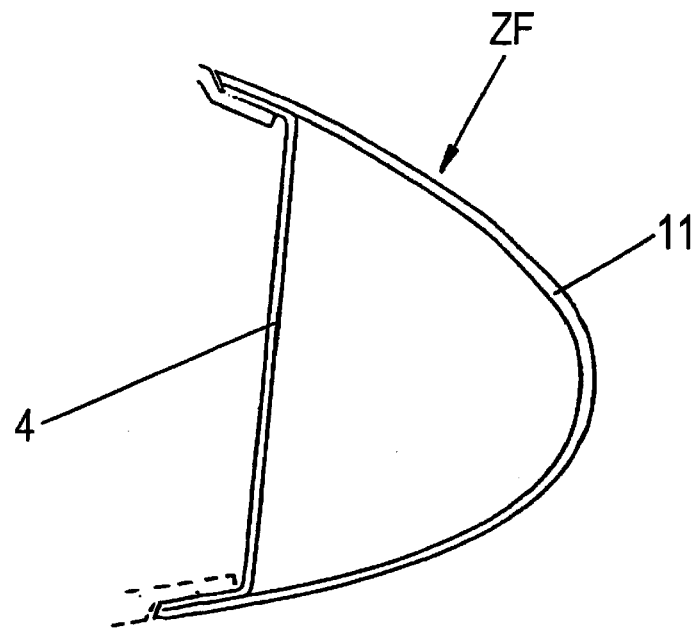
FIG.- 3
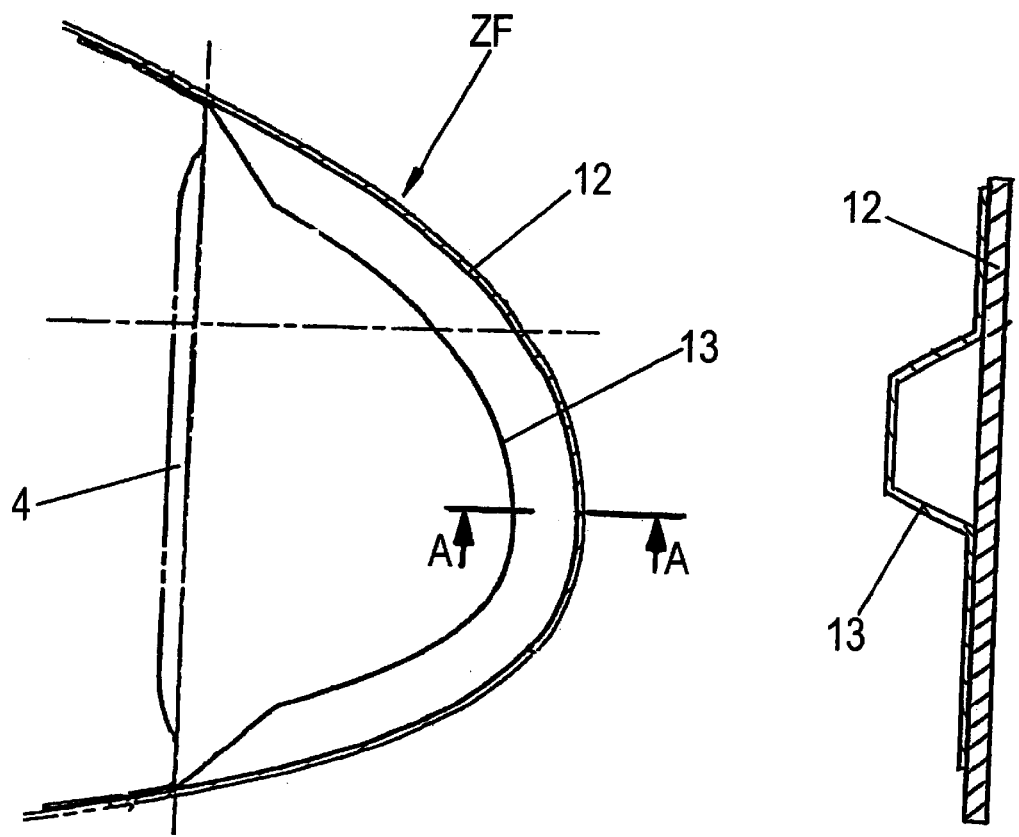
FIG.- 4a
FIG.- 4b

LEADING EDGE OF SUPPORTING SURFACES OF AIRCRAFT

FIELD OF THE INVENTION

The present invention refers to a leading edge of supporting surfaces of aircraft, such as wings, stabilisers and control surfaces, with a ribless structure and a specific frontal area against impacts.

The leading edge may be of a fixed, detachable, articulated or mixed type, and may include detachable panels or access covers.

The manufacture of leading edges in accordance with the present invention is based on theoretical concepts which have been supported by trials and practical developments and which finally have allowed manufacture and certification on commercial aircraft.

The definition of the leading edge is divided conceptually into two parts:

One part is basically structural, called the primary structure, which occupies most of the leading edge and is made up of almost all the upper and lower covering panels of said leading edge and two auxiliary spars, at least one of which is diagonal and makes up the basic conceptual element which allows the classic multi-rib structure to be eliminated from leading edges.

The second part, called frontal area, has a more local character but with a very specific function. In effect, its geometry serves to close the leading edge at the front, although its main object is to withstand erosion and the different types of impact which, as is known, are the most typical problems of this area.

The present invention is basically oriented towards all types of leading edge structures as elements belonging to supporting surfaces of aircraft, and it has a valid application in leading edges with a conventional metallic structure. However, the invention has been developed mainly with regard to the partial or total use of composite materials, especially carbon fibre.

The materials which can be used in the two conceptual parts mentioned above (primary structure and frontal area) may have a wide spectrum and a high degree of combination with each other. The most important, according to their configuration, are as follows:

Upper and lower covering panels

Metallic materials (plate with stiffeners or mechanised panels).

Composite materials: ("sandwich" type or solid laminate with stiffeners, obtained in their different forms: tape, fabric, RTM (Resin Transfer Moulding), RFI (Resin Film Infusion) or thermoplastics).

Diagonal and frontal spars

Metallic material (plate rigidified with ridges or corrugations).

Composite material (rigidified laminate or "sandwich" type).

Frontal area

Mainly metallic material (Al alloys or CSP-DB (superplastic shaping and bonding diffusion)).

Composite materials (new materials with a high degree of impact energy absorption).

BACKGROUND OF THE INVENTION

Until a few decades ago, the leading edges of almost all the supporting surfaces of aircraft had a metallic structure with a configuration of an outer covering of plate and an inner structure of the multi-rib type.

With the arrival of composite materials this type of structure has continued to be applied in a carbonised version but, at the same time, a step has been taken towards new solutions with structures of the "sandwich" type (honeycomb), with a new configuration in which there are practically no ribs.

Up to the present time, the applicant has applied a very significant number of these solutions to different types of aeroplanes. Among them, many have been with carbon fibre, as in theory, the good rigidity and low weight of this material makes it extremely attractive. However, against this, there is the fragility of this material and the need to withstand the impact of birds, which affects the weight, giving a final result of doubtful effectiveness. The applicant's experience has been developed and confirmed with many trials in a large-scale technological project called GSS (Large Supporting Surfaces). This work has made the following trinomial compatible in a reasonable and effective way:

Carbon fibre (less weight)

Minimal number of ribs (lower cost)

Large impact capacity (need for safety).

SUMMARY OF THE INVENTION

Based on his own previous technology, the applicant has developed the present invention for obtaining leading edges of supporting surfaces in aircraft, in which two basic concepts (primary structure and frontal area of the leading edge) are simultaneously applied, with very specific purposes and configurations.

Specifically, the invention has developed a leading edge of aircraft supporting surfaces in which the primary structure comprises an aerodynamic outer part made up of two covering panels, one upper and one lower, and an inner part made up of two spars, at least one of which has a diagonal configuration and another which closes in its frontal part, the two covering panels and the two spars constituting the strong and rigid structural combination of the leading edge. The frontal area of the leading edge is made up of one or two elemental parts which determine a kind of roof tile which closes the outer aerodynamic contour of the leading edge profile and which provides the latter with good behaviour against erosion, operational impacts on the ground and, above all, impact of birds in flight.

The covering panels, the spars and the frontal area of the leading edge may be made of a material selected from metals and composite materials.

Preferably, the composite material of said panels is selected from composite materials of the "sandwich" type and solid laminates with stiffeners, obtained in their different forms, such as fabrics, tapes, RTM, RFI or thermoplastics, or alternatively, the metal of the covering panels consists of metallic plate with stiffeners or mechanised portions.

Moreover, the metal of the spars may consist of rigidified metallic plate with ridges or corrugations, and the composite material of said spars is selected from composite materials of the "sandwich" type and rigidified laminates.

With respect to the frontal area of the leading edge, the metal of the same may be chosen from among aluminium alloys and titanium elements manufactured by a CSP-DB process, and the composite materials of said central area may be selected from new materials with a high degree of impact energy absorption.

Preferably, the covering panels and the spars consist of a "sandwich" type composite material made up of outer laminates of carbon fibre which have a core of the honeycomb type solidly joined to their inside. Alternatively, the covering panels and the spars may consist of a solid laminate constituting an outer covering and stiffeners arranged in the direction of the chord to stabilise the covering and give it rigidity.

According to an aspect of the invention, the inner diagonal and frontal spars may consist of metallic plate with dimples and voids for lightness.

According to another aspect of the invention, the lower covering panel of the leading edge may be fixed with screws so that it can be detached, in which case the diagonal spar is provided with voids to facilitate access and inspection of the inner enclosure of the leading edge once the lower covering panel has been detached, said diagonal spar being also fixed with rivets arranged in intermediate local positions.

According to a further aspect of the invention, the frontal area of the leading edge may consist of a single metallic plate which is chemically shaped and milled in local areas.

Alternatively, the frontal area of the leading edge may consist of two metallic plates of aluminium joined together, one inner and the other outer, configured according to the aerodynamic profile of the leading edge.

As another alternative, the frontal area may consist of a titanium element manufactured by a CSP-DB process. In this case, the frontal spar of the leading edge may form part of the titanium element of the frontal area.

BRIEF DESCRIPTION OF THE DRAWINGS

The foregoing and other features and advantages of the present invention will become clearer by reading the following description, given by way of example, with reference to the attached drawings, which show.

DETAILED DESCRIPTION OF THE INVENTION

With reference to the drawings, the components of the leading edge of the invention will be described separately below, as well as the coupling of the same to each other to obtain the final leading edge assembly.

Primary Structure of the Leading Edge

Figure 1:
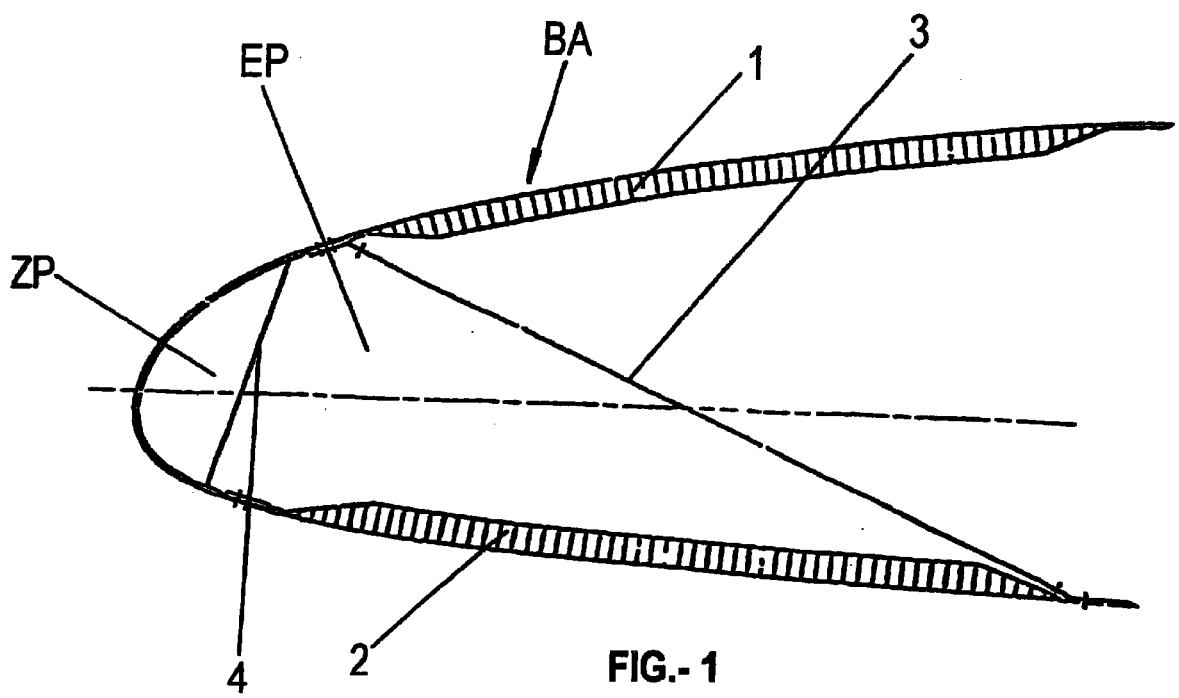
FIG. 1, a typical section of a leading edge in accordance with the invention, emphasising a general configuration, FIG. 2, a representation of elements which make up the primary structure of the leading edge in one of its possible configurations, FIGS. 3, 4a, 4b, 5 and 6, simplified representations of different types of the frontal area of a leading edge, FIG. 4b being a cross-section through the line A—A of FIG. 4a, FIG. 7, shows a broken-down view of a section of a leading edge with its main components and FIG. 8, a perspective view of the structure of a leading edge assembly.

This element, designated by EP in FIG. 1, is made up of two types of components. On the one hand, the outer or aerodynamic structure made up of two upper and lower covering panels 1, 2 and, on the other hand, the inner structure made up of two spars 3, 4 of which spar 3 has a diagonal configuration and spar 4 is a closing spar in the frontal part of the leading edge BA.

Figure 2:
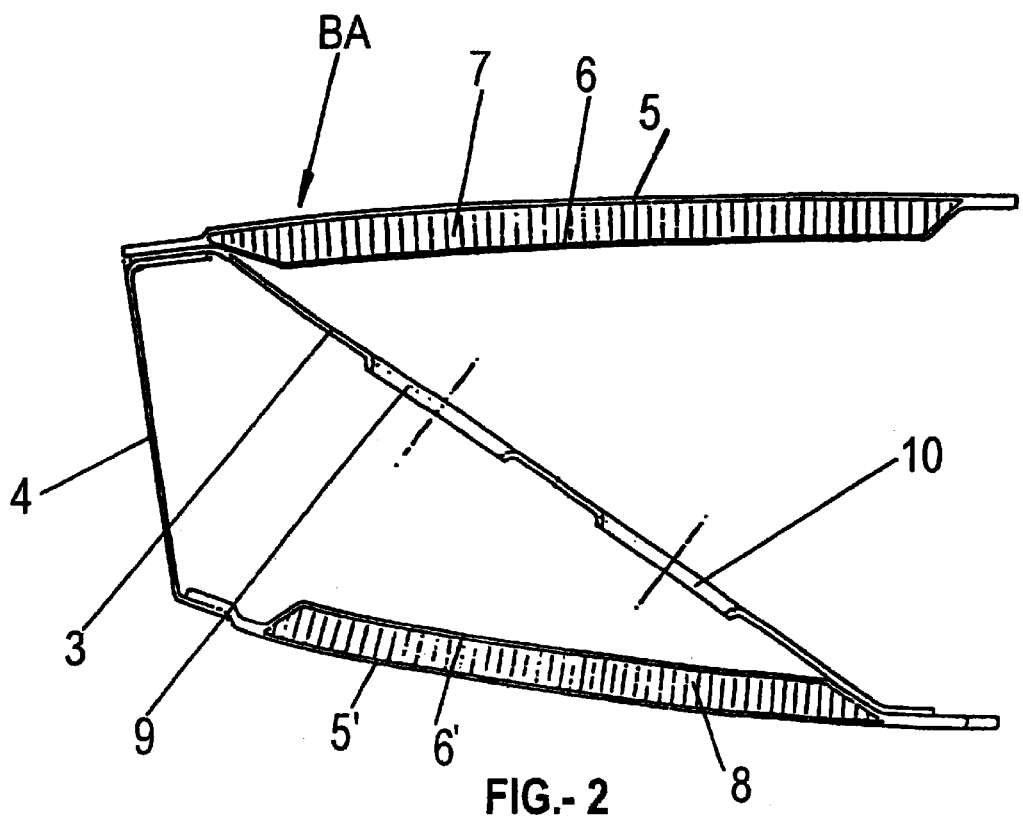

As illustrated in FIG. 2, the joining and interconnection of the four said elements (covering panels 1, 2 and spars 3, 4) make up the strong and rigid structural assembly of the leading edge BA.

The outer covering panels 1, 2, in their reference concept, are the most suitable to be manufactured in composite materials (basically carbon fibre due to its favourable characteristics of rigidity and low weight). These panels 1, 2 may have the form of a "sandwich", that is, they may consist of outer laminates 5, 5' and 6, 6' made of carbon fibre which have a core 7, 8 of the honeycomb type solidly joined inside.

Alternatively, the outer covering panels 1, 2 may have the form of a solid laminate in its conventional concept of an outer covering and stiffeners (in the direction of the chord) to stabilise the covering and give it rigidity.

From the point of view of accessibility and inspection, the lower covering panel 2 may be in the form of a detachable panel or cover intended to give access to possible installations situated inside the enclosure of the leading edge BA. In this case, the diagonal spar 3 is to have the appropriate voids 9, 10. Moreover, in this case, the lower joining will have a dual character: detachable with screws for the panels and fixed with rivets for the diagonal spar 3 (in intermediate local positions).

The two inner diagonal and frontal spars 3, 4 may also be manufactured according to the concepts of the "sandwich" or solid laminate already mentioned in relation to the covering panels 1, 2, but they are also suitable elements for manufacturing in metallic plate with dimples and voids for lightness. This decision is to be taken according to the dimensions or requirements of the programme.

In general terms, the four elements of this assembly, that is, the outer covering panels 1, 2 and the spars 3, 4, are oriented as stated above, towards manufacturing in carbon fibre but, when there are specific reasons for doing so, they may also be developed in any type of metallic structure of a conventional kind. This is especially relevant to the diagonal and frontal spars 3, 4.

Specifically, as part of the invention development, the frontal spar 4 has been tested, in respect of size and shape, in metallic plate with the additional intention of using it as a supplementary barrier against the impact of birds, with positive results.

Frontal Area

This element, designated by ZF in the drawings, is made up of one or two fundamental parts which form a kind of roof tile with a dual function: on the one hand, it is intended to close the outer aerodynamic contour of the profile of the leading edge BA and, on the other hand, it has a specific function aimed at achieving good behaviour against erosion, operational impacts on the ground and, above all, the impact of birds in flight.

To comply with this object, it is very recommendable that the frontal area ZF has a plastic nature with high impact energy absorption capacity, which is more characteristic of metallic-type materials, such as aluminium or titanium alloys.

Within the scope of the present invention, the following types of configuration have been developed:

a) The frontal area ZF is made up of a single metallic plate 11 as a simple element which has been shaped and subjected to chemical milling in local areas. This configuration, illustrated in FIG. 3, is in general applicable to leading edges BA of a rather small size.

b) The frontal area ZF comprises two metallic plates 12, 13 made of aluminium, one outer 12, according to the aerodynamic profile of the leading edge BA, and the other inner 13, both plates being joined together.

Figure 5:
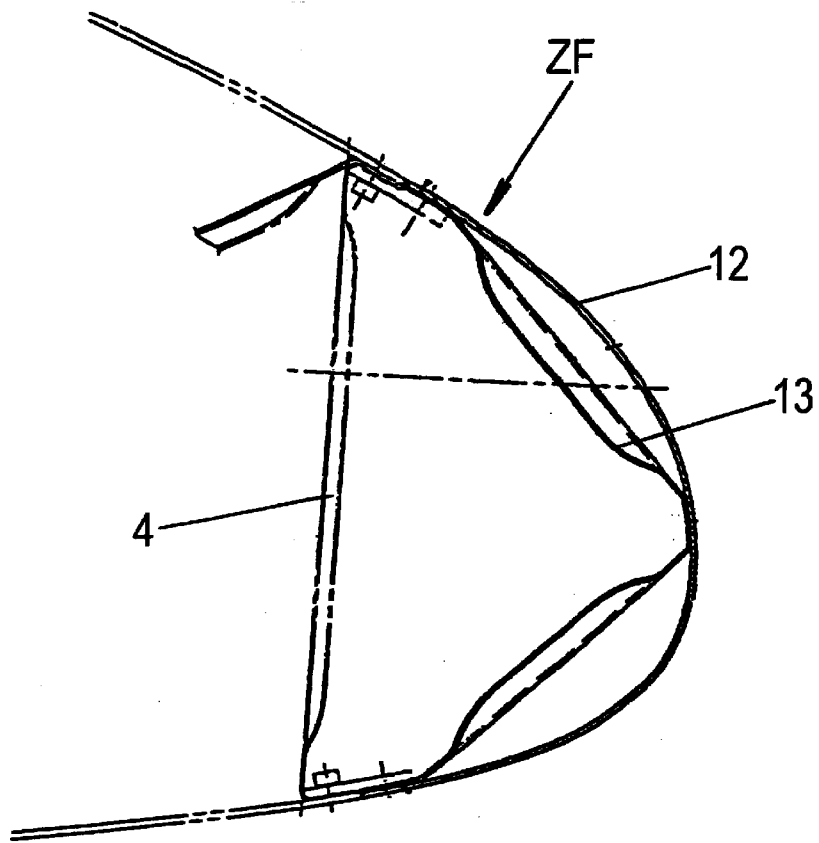
Figure 6:
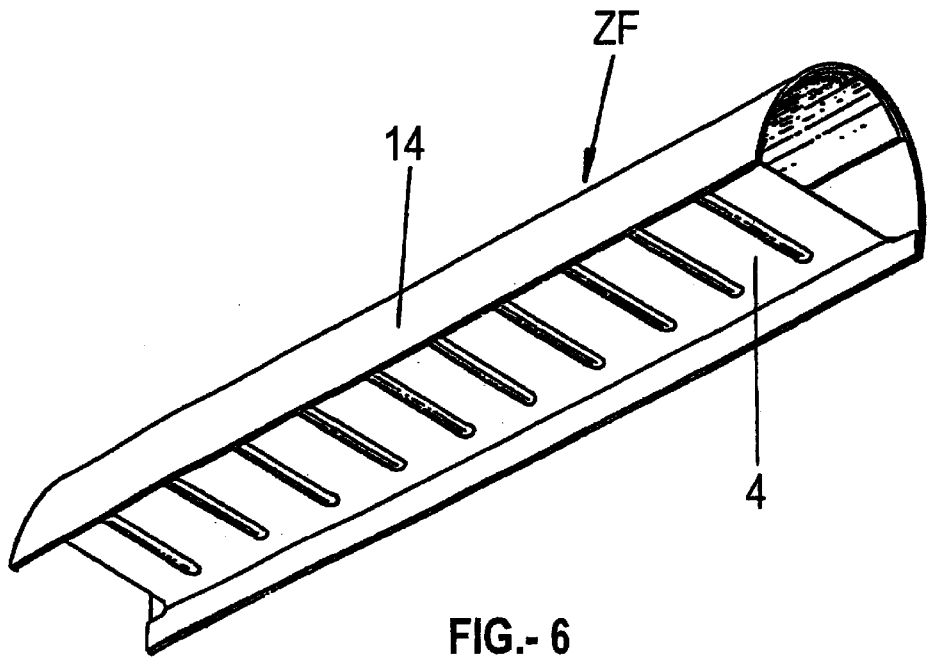

The inner plate 13 has been tested in different forms of configuration and its function is to give rigidity and a greater capacity to absorb energy to the outer plate 12 when its dimension is relatively large. This configuration is illustrated in FIGS. 4a, 4b and 5 of the drawings.

c) The frontal area ZF is made up of a titanium element 14 manufactured by a CSP-DB process (super-plastic shaping and bonding diffusion). In this configuration, illustrated in FIG. 6, the frontal spar 4 may come to form part of the frontal area ZF instead of belonging to the primary structure EP of the leading edge BA.

Leading Edge Assembly

By combining the two parts mentioned above, that is the primary structure EP and the frontal area ZF, the final assembly of the leading edge BA is formed, which is thus prepared to be mounted on the torsion box of the aerodynamic surface. In its most conventional form, this assembly is joined to two flanges provided in the area of the chords of the frontal spar of the torsion box of the aerodynamic surface. In addition to this longitudinal connection, according to the wingspan, a connection is also necessary on the existing ribs at the ends of each of the sections into which it has been necessary to divide the leading edge BA due to general manufacturing considerations.

In this type of structures, the transmission of loads from the leading edge BA to the central box is homogeneous and continuous throughout the wingspan, thus preventing the effect of local load concentration which occurs in the conventional solution of multi-ribs and which is frequently the source of fatigue problems.

The type of connection with the torsion box and with the end ribs may be either of the fixed type with rivets or detachable by means of screws in the cases in which this feature is recommendable.

Figure 7:
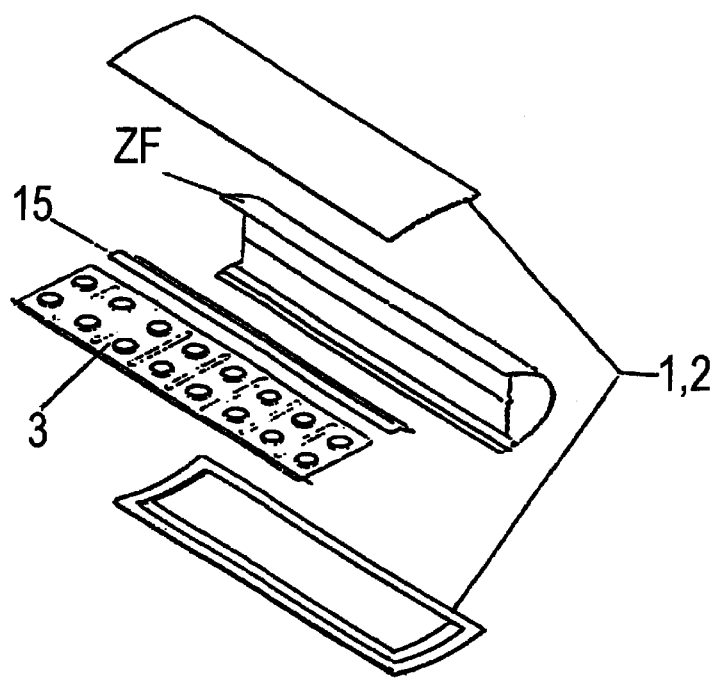
Figure 8:
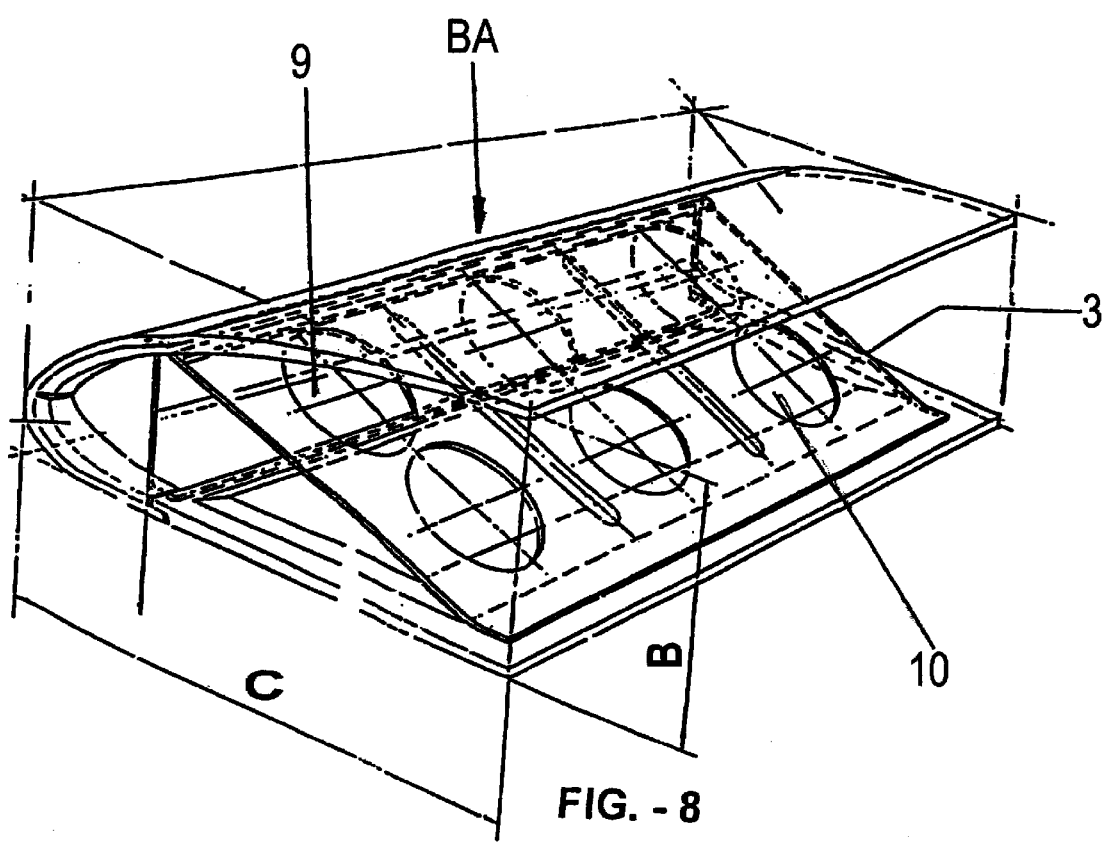

FIGS. 7 and 8 of the drawings show the different components of the leading edge BA in both its broken down form (FIG. 7) and in its assembled form (FIG. 8). FIG. 7 also illustrates an aluminium angular part 15 provided to fix the diagonal spar 3 to the leading edge BA. In FIG. 8 the height of the leading edge BA is designated by B and the depth of the same is designated by c.

The leading edge BA is manufactured by manufacturing the primary structure EP and the frontal area ZF separately and later assembling both components by any appropriate process.

As appears from the foregoing description, the present invention has developed a design concept for leading edges of supporting surfaces, based on the joint application of two specific concepts, of which the first, which is structural, is made up of two covering panels 1, 2 and two spars 3, 4, of which at least one is diagonal. The second concept, situated in the frontal area ZF, is characterised by high impact resistance.

The first concept constitutes a rigid and strong structure able to withstand the specific aerodynamic and/or dynamic loads of the leading edge BA. The second concept is more specific with respect to resistance to erosion and impacts, both on the ground and in flight, and is easy to replace.

With respect to the materials used, it is to be noted that, for the primary structure EP, priority is given to the use of composite materials, either of the core type or solid laminate type in its different forms (fabric, tape, RTM, RFI or thermoplastics), even when in some of its components, due to their geometry or any other reason, metallic type structures could be used. On the other hand, the assembly of the frontal area ZF favours the use of metallic materials, such as aluminium or titanium alloys, although the use of composite materials with good energy absorption features would be possible.

In the foregoing description, the aspects of the present invention which are considered essential have been detailed, but, as will be understood, it would be possible to carry out modifications. This means that the foregoing description must be seen as merely illustrative and non-restrictive in respect of the invention, the scope of the latter being defined solely by the content of the attached claims.

What is claimed is:

1. A sub-assembled leading edge portion adapted for connection to an aerodynamic structure of an aircraft, said leading edge portion comprising:

a rigid structural assembly providing structural strength for the leading edge portion, said rigid structural assembly comprising front and rear spars and upper and lower covers, said rigid structural assembly being connectable to a leading edge of the aerodynamic structure to form an aerodynamic profile for said structure at said leading edge, said front and rear spars being coextensive and extending along the entire length of the rigid assembly, said rear spar extending diagonally rearwards from a front connection with an upper flange of the front spar and a leading edge of the upper cover to a rear connection with a trailing edge of the lower cover, and a nose fairing connected to said rigid structural assembly at said front connection of the upper flange of the front spar and at a lower flange of the front spar, said lower cover having a leading edge connected to said lower flange of said front spar, said nose fairing providing an airfoil shape for the aerodynamic profile of the structural assembly.

2. The sub-assembled leading edge portion of claim 1, wherein the lower cover is fixed with screws so that it can be detached, and the diagonal spar is provided with openings to facilitate access and inspection of the inner area of the leading edge portion after the lower cover has been detached, said diagonal spar being also fixed with rivets arranged in intermediate local positions.

3. The sub-assembled leading edge portion of claim 1, wherein the nose fairing comprises a single metallic plate which is shaped and chemically milled in local areas.

4. The sub-assembled leading edge portion of claim 1, wherein the nose fairing comprises two metallic plates joined together, one inner and the other outer shaped according to the aerodynamic profile of the leading edge portion.

5. The sub-assembled leading edge portion of claim 1, wherein an angular part is provided to fix the diagonal spar to the nose fairing.

6. A method of forming a leading edge portion of an aerodynamic structure of an aircraft, said method comprising the steps of:

separately forming a sub-assembly of a leading edge portion adapted for assembly with an aerodynamic structure of an aircraft, said step of separately forming the sub-assembly comprising:

assembling a rigid structure providing structural strength for the leading edge portion by connecting upper and lower covers by front and rear spars, the front spar being a vertical member provided with upper and lower flanges connected respectively to front edges of the upper and lower covers, the rear spar extending diagonally between the covers and having a lower flange connected to a rear edge of the lower cover and an upper flange connected to the upper flange of the front spar and to the front edge of the upper cover, said front and rear spars being coextensive and extending along the entire length of the subassembly, and connecting a nose fairing having an airfoil contour merging with an outer aerodynamic contour formed by said upper and lower covers.

7. The method of claim 6 in which the nose fairing has upper and lower trailing edges, the upper trailing edge being connected to the upper flange of the front spar and the lower trailing edge being connected to the lower flange of the front spar.

8. The method of claim 6, comprising reinforcing the nose fairing with internal bracing means.

9. The method of claim 6, comprising forming access holes in said rear spar.

10. The method of claim 6 connecting the sub-assembly to the remainder of the aircraft structure at said trailing edge of the upper cover and at the lower flange of the rear spar.

11. The method of claim 6 comprising detachably connecting the sub-assembly to the remainder of the aircraft structure.

* * * * *

UNITED STATES PATENT AND TRADEMARK OFFICE
CERTIFICATE OF CORRECTION

PATENT NO.     : 6,616,101 B2
DATED          : September 9, 2003
INVENTOR(S)    : DeCastro Nodal et al.

It is certified that error appears in the above-identified patent and that said Letters Patent is hereby corrected as shown below:

Title page,
Item [*] Notice, should read:
-- Subject to any disclaimer, the term of this patent is extended or adjusted under 35 U.S.C. 154(b) by 6 days. --

Signed and Sealed this

Sixth Day of April, 2004

JON W. DUDAS
*Acting Director of the United States Patent and Trademark Office*